May 17, 1960  A. A. LACHANCE  2,937,060
WHEEL HUB CONSTRUCTION
Filed July 15, 1959
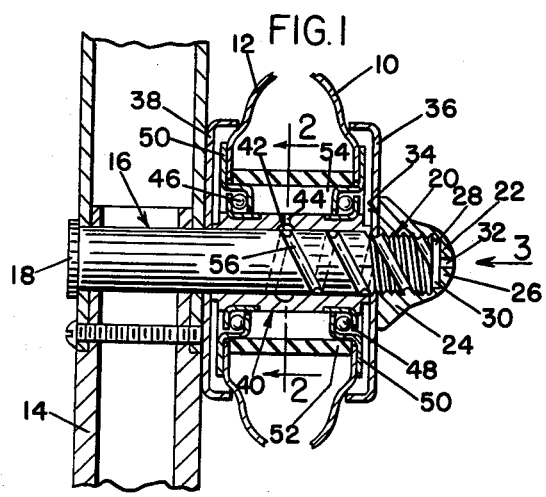
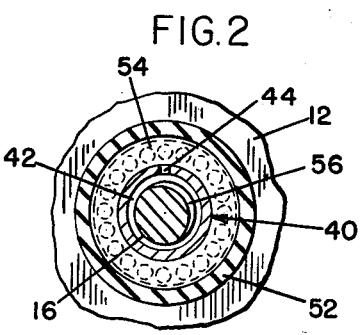
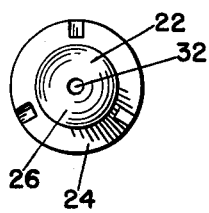
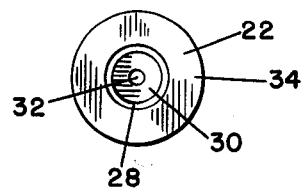
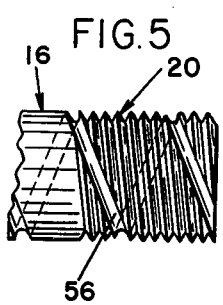
INVENTOR
ARMAND A. LACHANCE
by Charles P. Fay,
ATTORNEY

United States Patent Office 2,937,060
Patented May 17, 1960

2,937,060
WHEEL HUB CONSTRUCTION

Armand A. Lachance, North Oxford, Mass.

Application July 15, 1959, Serial No. 827,205

4 Claims. (Cl. 308—187)

This invention relates to a new and improved wheel hub construction for general use, and the principal object of the invention resides in the provision of a wheel hub construction including means for more easily and efficiently maintaining the same with the proper amount of grease in the bearings thereof and for applying grease thereto.

Other objects of the invention include the provision of a wheel hub including an axle, this axle being adapted to be secured to some supporting member which in turn is adapted to be supported by the wheel, wherein said axle is provided with a threaded end portion for the reception of a wheel holding nut, the threaded portion of the nut having extending inwardly from the extreme end thereof a grease-receiving and transmission groove, said groove extending inwardly adjacent the center portion of the axle to coincide with an annular, internal countersink in a cylindrical bearing block surrounding said axle, said countersink having a radial aperture communicating with the exterior of said block and into the area of the bearings of the wheel, all to the end that grease may be inserted through a grease-receiving aperture in the nut and transmitted along said groove to the countersink and through the countersink and aperture into the bearing area, this construction thereby providing a complete passage for the grease, the parts of the construction being easily and quickly assembled without locating one part relative to another, etc., in order to provide for the grease passage to be made continuous.

Other objects and advantages of the invention will appear hereinafter.

Reference is to be had to the accompanying drawings, in which—

Fig. 1 is a sectional view illustrating the bearing and axle construction;

Fig. 2 is a section on line 2—2 of Fig. 1;

Fig. 3 is a view in elevation showing the nut, looking in the direction of arrow 3 in Fig. 1;

Fig. 4 is a view of the reverse side of the nut; and

Fig. 5 is an enlarged view in elevation showing the grease groove in the threads on the axle.

In illustrating the present invention, it is shown particularly in Figs. 1 and 2 as incorporated in a wheel which may be provided with the usual spokes or discs such as are shown at 10 and 12, these discs or spokes of course being provided with a peripheral rim (not shown) upon which the usual tire is mounted. Also a conventional support 14 of any kind is shown, and this support may of course be any kind of element on a vehicle such as a cart, cycle, etc. where it is convenient to mount a wheel for support thereof, etc. On this support there is provided the axle generally indicated at 16, this axle being provided for instance with a head 18 which bears against the support 14 at one side thereof to position the axle, the axle extending through the support as shown clearly in Fig. 1 to provide a support for the wheel itself.

The axle 16 is screw-threaded at its opposite end as at 20 for the reception of an acorn-type nut 22 which in this case is shown as semi-conical at 24 and rounded off, e.g., as at 26 in a hemispherical condition. However, the nut is threaded interiorly thereof to mesh with the threads at 20 to hold the wheel, but there is provided a stop means 28 of any kind so that there is always present a small chamber 30 inside the nut. A grease-receiving passage 32 communicates with this chamber. Passage 56 is spiral and extends into the axle deeper than the threads, so that the latter can be completely obscured by the nut, but the passage is still present. The conical portion 24 of the nut is flat as at 34 to bear against a hub member in the shape of a disc such as at 36, this disc bearing at its periphery on the discs 10 or the spokes as the case may be. The opposite side of the wheel may be provided with a corresponding or oppositely-disposed disc as at 38, but the discs 36 and 38 are conventional and need not be further described.

Mounted on the axle 16 there is a bearing block which is generally indicated at 40. This bearing block has a central annular countersink 42 running completely around the axle. A radial aperture at 44 communicates with this countersink and provides a passage to the outside surface of the bearing block 40 as clearly shown in Figs. 1 and 2.

Bearings of any kind such as the ball bearings shown at 46 and 48 may be utilized and these are mounted on the bearing block and are provided with exterior races that cooperate to secure and position the bearings in place with relation to the discs 10 and 12. The outer races 50 provide a support for a flexible cylindrical collar 52 which acts as a grease-retaining ring, it being understood that the annular space or cylindrical chamber indicated at 54 is filled with grease and by this means the bearings are always supplied with grease. The grease will also extend to other portions of the axle construction but is always retained within the various discs and the grease-retaining collar 52.

In order to supply grease in quantity to the chamber 54 and bearings 46 and 48, it is only necessary to apply the nozzle of a grease-gun to the aperture 32. This aperture then leads the grease to the end of a longitudinal, spiral grease-transmission groove 56, and a continued pressure travels the grease along the axle into the countersing 42 all about the axle. The grease then flows outwardly through the passage 44 to completely fill chamber 54. At the same time, some grease is provided within the disc 36.

The essential characteristic of the present invention is that even though the screw-threads on the axle serve to hold the nut more or less in the normal manner, nevertheless a clear efficient grease passage is provided merely by cutting the spiral passage 56 into the axle and below the surface of the roots of the threads, so that regardless of the presence of the nut there is still a passage through the threaded portion of the axle, see Fig. 5.

This groove or passage 32 has to be aligned with countersink 42 at all times, no matter how the parts are assembled as to rotational position, and thus a better, faster assembled and less expensive construction is provided.

Having thus described my invention and the advantages thereof, I do not wish to be limited to the details herein disclosed, otherwise than as set forth in the claims, but what I claim is:

1. A wheel hub construction comprising a threaded axle, a bearing block on said axle for mounting the bearings of a wheel, bearings on said block, a nut screwthreadedly engaged with the end of the axle and engaging a portion of the wheel to hold the wheel thereto, a grease-retaining and transmission groove in said axle, said groove extending in the area of the threads inwardly through the threads to a central location relative to said block, means on said bearing block forming an interior chamber receiving the grease, and a passage from said chamber through the block to the area of the bearings.

2. A wheel hub construction comprising a threaded axle, a bearing block on said axle for mounting the bearings of a wheel, bearings on said block, a nut screw-threadedly engaged with the end of the axle and engaging a portion of the wheel to hold the wheel thereto, a spiral grease-retaining and transmission groove in said axle, said groove extending in the area of the threads inwardly through the threads to a central location relative to said block, means on said bearing block forming an interior chamber receiving the grease, a passage from said chamber through the block to the area of the bearings, and a grease seal about the block and including the bearings.

3. A wheel hub construction comprising a threaded axle, a bearing block on said axle for mounting the bearings of a wheel, bearings on said block, a nut screw-threadedly engaged with the end of the axle and engaging a portion of the wheel to hold the wheel thereto, a grease-retaining and transmission groove in said axle, said groove extending in the area of the threads inwardly through the threads to a central location relative to said block, means on said bearing block forming an interior chamber receiving the grease, and a passage from said chamber through the block to the area of the bearings, a stop in the nut preventing the axle from seating fully therein, forming a grease chamber in the nut and a grease-receiving opening in the nut, said opening leading to the last-named chamber.

4. A wheel hub construction comprising a threaded axle, a bearing block on said axle for mounting the bearings of a wheel, bearings on said block, a nut screw-threadedly engaged with the end of the axle and engaging a portion of the wheel to hold the wheel thereto, a grease-retaining and transmission groove in said axle, said groove extending in the area of the threads inwardly through the threads to a central location relative to said block, means on said bearing block forming an interior chamber receiving the grease, and a passage from said chamber through the block to the area of the bearings, said groove being spiral and deeper than the threads so that the grease may be forced along said passage when the nut is in position on the axle.

References Cited in the file of this patent

UNITED STATES PATENTS

| | | |
|---|---|---|
| 502,927 | Jones | Aug. 8, 1893 |
| 2,566,322 | Flowers | Sept. 4, 1951 |
| 2,752,208 | Wightman | June 26, 1956 |

FOREIGN PATENTS

| | | |
|---|---|---|
| 520,257 | Italy | Mar. 21, 1955 |